US012644027B1

(12) United States Patent
El-Tahlawy et al.

(10) Patent No.: US 12,644,027 B1
(45) Date of Patent: Jun. 2, 2026

(54) BUILDING WRAP

(71) Applicant: SHURTAPE TECHNOLOGIES, LLC, Hickory, NC (US)

(72) Inventors: Khaled El-Tahlawy, Hickory, NC (US); Kevin Chou, Hickory, NC (US)

(73) Assignee: SHURTAPE TECHNOLOGIES, LLC, Hickory, NC (US)

( * ) Notice: Subject to any disclaimer, the term of this patent is extended or adjusted under 35 U.S.C. 154(b) by 631 days.

(21) Appl. No.: 16/830,066

(22) Filed: Mar. 25, 2020

Related U.S. Application Data

(60) Provisional application No. 62/823,743, filed on Mar. 26, 2019.

(51) Int. Cl.
| | |
|---|---|
| *C09J 7/40* | (2018.01) |
| *C09J 7/29* | (2018.01) |
| *C09J 7/38* | (2018.01) |

(52) U.S. Cl.
CPC ................. *C09J 7/401* (2018.01); *C09J 7/29* (2018.01); *C09J 7/38* (2018.01); *C09J 7/403* (2018.01); *C09J 2433/00* (2013.01); *C09J 2483/005* (2013.01)

(58) Field of Classification Search
None
See application file for complete search history.

(56) References Cited

U.S. PATENT DOCUMENTS

| | | | | |
|---|---|---|---|---|
| 2,532,011 | A | * 11/1950 | Dahlquist | ................ C09J 7/201 |
| | | | | 525/61 |
| 3,169,899 | A | 2/1965 | Steuber | |
| 3,532,589 | A | 10/1970 | David | |
| 5,061,535 | A | * 10/1991 | Kreckel | ................ D21H 19/32 |
| | | | | 428/913 |
| 5,496,636 | A | 3/1996 | Gu et al. | |
| 6,133,173 | A | 10/2000 | Riedel et al. | |
| 6,541,109 | B1 | * 4/2003 | Kumar | ................ C09J 7/401 |
| | | | | 525/464 |
| 8,277,915 | B2 | 10/2012 | Couturier | |
| 11,090,682 | B2 | * 8/2021 | Rattray | ................ B05D 5/06 |
| 2004/0180195 | A1 | * 9/2004 | Macuga | ................ C09J 7/22 |
| | | | | 428/343 |
| 2012/0164417 | A1 | 6/2012 | Marquis | |
| 2013/0059105 | A1 | * 3/2013 | Wright | ................ C09D 133/14 |
| | | | | 427/515 |
| 2017/0058510 | A1 | 3/2017 | Seabaugh et al. | |

FOREIGN PATENT DOCUMENTS

| | | | |
|---|---|---|---|
| EP | 0969433 | B1 | 9/2003 |

* cited by examiner

*Primary Examiner* — Patricia L. Nordmeyer
(74) *Attorney, Agent, or Firm* — Lippes Mathias LLP

(57) ABSTRACT

A roll comprising an air and water barrier article is provided. The barrier article has opposed first and second major surfaces. A pressure sensitive adhesive is disposed on at least the first major surface and a release agent is disposed on the opposing second major surface. The release agent covers less than 100% of the second major surface and the pressure sensitive adhesive contacts predominately, if not exclusively, the release agent when wound in the roll.

20 Claims, 3 Drawing Sheets

BUILDING WRAP

This application claims the benefit of U.S. Provisional Application No. 62/823,743, filed Mar. 26, 2019, the disclosure of which is herein incorporated by reference.

BACKGROUND

The present exemplary embodiment relates to a self-adhered, vapor permeable, water blocking barrier membrane. It finds particular application as a building wrap material and will be described with particular reference thereto. However, it is to be appreciated that the present exemplary embodiment is also amenable to other similar applications.

There are many forms of air barriers commercially available. One of the more widely recognized types are those which are mechanically fastened to the building, such as DuPont's Tyvek Commercial Wrap. This consists of a vapor permeable spun bond polyethylene film or membrane. To be an effective air barrier, mechanically fastened types must have every puncture, such as nail holes, and seams sealed. Having to seal every single nail or staple hole and seam is labor intensive and time consuming, but without such effort, they act as a water resistive barrier only. Another major drawback with the mechanically fastened types is lack of adhesion to the substrate. This free-standing film type is easily torn from wind during installation or prior to covering the membrane with the building exterior. Also, given the stiffness of the material it is very noisy and difficult to handle in windy situations. The film may also tear due to negative pressure such as stack pressure. Thus, these mechanically fastened wraps have many drawbacks.

Fluid applied air barrier membranes, such as Grace Perm-A-Barrier VP and Perm-A-Barrier Liquid, are available and form an effective and durable air barrier. These types of barriers are fully adhered to the substrate which provides numerous benefits over the mechanical fastened type, such as ease of application, reduced tendency to tear under negative pressure, and no water infiltration. Fluid applied membranes can be either vapor permeable or impermeable. However, liquid spray applied product cannot be used in many situations, such as windy days, or close proximity to other buildings.

Self-adhered sheet air barrier membranes are available, such as Grace Perm-A-Barrier WM. This type of product is applied in peel and stick form and provide an effective air barrier that seals nail and other punctures, bridges cracks and resists tearing. Most of these types of sheets are composed of a polyethylene film and a very thick layer of asphaltic based adhesive. Given the nature of the adhesive, these types of membranes are impermeable to vapor.

Air barrier systems control movement of air, and specifically water vapor, across a surface of a structure, such as a building enclosure. In exterior walls, uncontrolled air flow is the greatest source of moisture and condensation damage. Indoor comfort is affected by air temperature, relative humidity, direction of airflow and surrounding surface temperatures. Indoor air quality is enhanced by air barrier systems by efficiently keeping pollutants out of building interiors. Pollutants include water vapor, suspended particulates, dust, insects, smells, etc. Air barrier systems have significant impact on electricity consumption and gas bills. Air barrier systems in nonresidential buildings are estimated to reduce air leakage by up to 83 percent, reduce gas bills more than 40% and reduce electricity consumption more than 25% according to simulations by the National Institute of Standards and Technology (NIST) compared to typical buildings without air barriers. Water vapor is a key ingredient in corrosion and mold growth. Air barrier systems help prevent water vapor from being transported by air movement between exteriors and interiors of structures, such as buildings.

Previously known waterproofing sheets having both waterproofing property and moisture permeability have been developed. One typical example of such moisture permeable waterproofing sheets is flash-spun nonwoven fabrics. U.S. Pat. No. 3,169,899, for example, discloses a flash-spun nonwoven fabric. U.S. Pat. No. 3,532,589 discloses a method for producing a flash-spun nonwoven fabric. The nonwoven fabric thus obtained has an appropriate pore size. It blocks water, but allows water vapor to pass therethrough. A known example of the nonwoven fabric is commercially available under the trade designation "Tyvek" from E. I. Du Pont de Nemours and Company, Wilmington, Del. USA obtained by thermo-compressing a three-dimensionally-meshed fiber of high-density polyethylene. Such a moisture-permeable waterproofing sheet can prevent external water from infiltrating through the sheet, but can drain gathered moisture as water vapor.

Mechanical fasteners or adhesive fasteners, such as pressure sensitive adhesive tapes, can be used to affix the moisture-vapor permeable waterproofing sheet on substrates of exterior walls or to affix overlapped portions of two moisture-vapor permeable waterproofing sheets. As a result, moisture may permeate from gaps of such fasteners, such as nail holes, over a long period of time. It is beneficial for such moisture-vapor permeable waterproofing sheets to pass ASTM D-1970/D-1970M-13 or similar modified tests such as Modified Test 1 of ASTM D-1970/D-1970M13, Modified Test 2 of ASTM D-1970/D-1970M-13, or Modified Test 3 of ASTM D-1970/D-1970M-13 for nail sealability. It is also beneficial to provide easy application of the air and water barrier article to substrates, such as building components. Because self-adhered air barrier articles are used in wide width format, they can be difficult to handle. Application of air barrier articles is simplified if the release liner comes off on the external face of the air barrier article. This allows for removal of the liner after the air barrier article has been applied to a surface rather than simultaneously removing the liner while the air barrier article is being applied or removing the liner before application of the air barrier article.

It is also beneficial for the adhesives provided on the air barrier articles to provide robust adhesion in a variety of conditions. For example, it is beneficial for such an adhesive to adhere to wet substrates, which are common conditions on surfaces of building. However, as described in US2017/0058510, to prevent the adhesive from adhering to the barrier film when the wrap material is rolled, a liner that is separable from the wrap material at the time of installation is often included. The liner can be undesirable as it is wasteful and time consuming to remove and discard.

Currently, however, commercially available peel-and-stick building wraps typically consists of 3 layers of materials, e.g., release liner, pressure sensitive adhesive, and spun-bond vapor permeable membrane. This peel-and-stick building wrap has gained market share due to its simplicity in application without the need of using mechanical fasteners. Examples of such peel-and-stick building wrap include 3015VP from 3M and Delta Vent SA from Dorken. Unfortunately, the liner can be undesirable as it is wasteful and time consuming to remove and discard. The present disclosure provides an improved self-wound building wrap.

SUMMARY

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

According to a first embodiment, a roll comprising an air and water barrier article is provided. The barrier article has opposed first and second major surfaces. A pressure sensitive adhesive is disposed on at least the first major surface and a silicone release agent is disposed on the opposing second major surface. The silicone release agent covers less than 100% of the second major surface and the pressure sensitive adhesive contacts the silicone when wound in the roll.

According to another embodiment, a method of forming an air and water barrier article roll having opposing first and second major surfaces is provided. The method comprises applying a pressure sensitive adhesive in a pattern on the first major surface of the article, and applying a silicone release agent in a pattern on the opposing second major surface of the article. The silicone release agent covers less than 100% of the second major surface to provide a coverage area of silicone release agent and the pressure sensitive adhesive covers less than the coverage area of the silicone release agent on the second major surface. When wound into the roll, the pressure sensitive adhesive contacts the silicone rubber.

According to a further embodiment, a roll comprising an air and water barrier article having opposing first and second major surfaces is provided. A pressure sensitive adhesive is disposed on the first major surface of the article, and a release agent is disposed on the opposing second major surface of the article. The release agent covers less than 100% of the second major surface. The pressure sensitive adhesive contacts the release agent when wound in the roll.

The pressure sensitive adhesive can have an adhesion to the barrier article that is greater than the pressure sensitive adhesive to the release agent. Furthermore, the release agent can have an adhesive to the barrier article that is greater than the adhesive of the pressure sensitive adhesive to the release agent. This relationship ensures unwinding of the presently disclosed roll with the adhesive properly intact.

BRIEF DESCRIPTION OF THE DRAWINGS

The disclosure may be more completely understood in consideration of the following detailed description of various embodiments of the disclosure in connection with the accompanying figures, in which.

Figures 1, 2A, 2B, 2C, 2D:
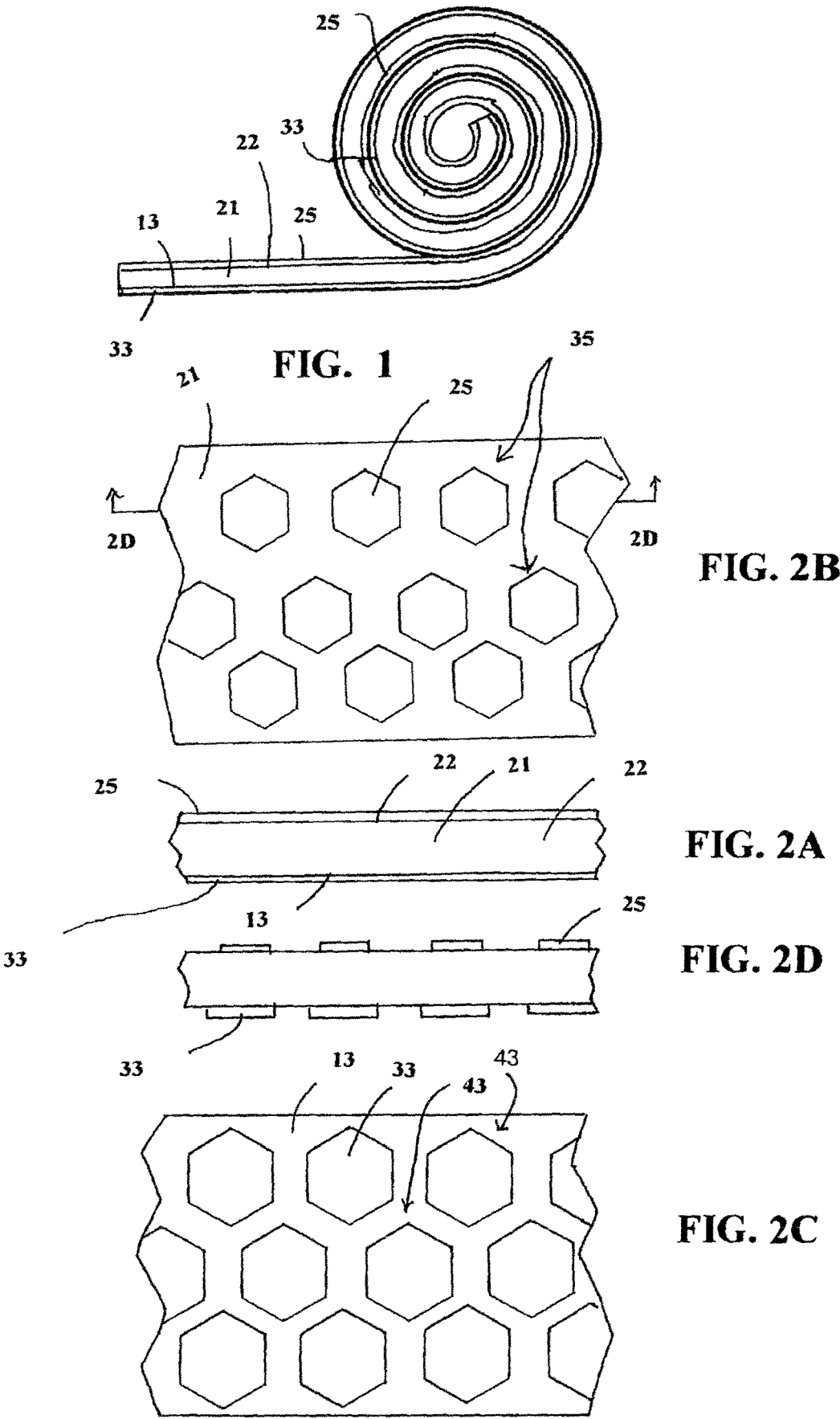
FIG. 1 is an end view of a roll of an air and water barrier article, pressure sensitive adhesive, and silicone release agent according to the present disclosure.
FIG. 2A is a side view of an exemplary embodiment of an air and water barrier article according to the present disclosure.
FIG. 2B is front side view of an exemplary embodiment of the air and water barrier article of FIG. 2A.
FIG. 2C is a rear side view of an exemplary embodiment of the air and water barrier article of FIG. 2A.
FIG. 2D is a cross section view of the air and water barrier article of FIG. 2A taken along line 2D-2D.

In the drawings, like reference numerals indicate like elements. While the above-identified drawings, which may not be drawn to scale, set forth various embodiments of the present disclosure, other embodiments are also contemplated, as noted in the Detailed Description. In all cases, this disclosure describes the invention through exemplary embodiments and not by express limitations. It should be understood that other modifications and embodiments can be devised by those skilled in the art, which fall within the scope and spirit of this disclosure.

DETAILED DESCRIPTION

As used in this specification, the recitation of numerical ranges by endpoints includes all numbers subsumed within that range (e.g. 1 to 5 includes 1, 1.5, 2, 2.75, 3, 3.8, 4, and 5, and the like).

Unless otherwise indicated, all numbers expressing quantities or ingredients, measurement of properties and so forth used in the Specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following defined terms, these definitions shall be applied for the entire Specification, including the claims, unless a different definition is provided in the claims or elsewhere in the Specification based upon a specific reference to a modification of a term used in the following Glossary:

The words "a", "an", and "the" are used interchangeably with "at least one" to mean one or more of the elements being described.

The term "layer" refers to any material or combination of materials on or overlaying a substrate.

Words of orientation such as "atop, "on," "covering," "uppermost," "overlaying," "underlying" and the like for describing the location of various layers, refer to the relative position of a layer with respect to a horizontally disposed, upwardly-facing substrate. It is not intended that the substrate, layers or articles encompassing the substrate and layers, should have any particular orientation in space during or after manufacture.

The terms "about" or "approximately" or "predominately" with reference to a numerical value or a shape means +/−five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

The term "(co)polymer" or "(co)polymeric" includes homopolymers and copolymers, as well as homopolymers or copolymers that may be formed in a miscible blend, e.g., by coextrusion or by reaction, including, e.g., transesterification. The term "copolymer" includes random, block, graft, and star copolymers.

The term "adjoining" with reference to a particular layer means joined with or attached to another layer, in a position wherein the two layers are either next to (i.e., adjacent to) and directly contacting each other, or contiguous with each other but not in direct contact (i.e., there are one or more additional layers intervening between the layers).

The term "discontinuous" as used herein means a coating having an interrupted extension along a two-dimensional surface. For example, in some embodiments, an air and water barrier article having a discontinuous coating of pressure sensitive adhesive does not fully cover a major surface of a polymeric material or a major surface of a porous layer.

The self-adhered, vapor permeable, air barrier membrane can be in sheet form, typically having a width (cross-direction or XD) in the range of about 30 to 250 cm, more typically about 60 to 160 cm, and a length (machine direction or MD) of about 5 to 80 m, more typically about 15 to 40 m, and is rolled up into a roll. The membrane can include a vapor permeable, spun-bond, non-woven polyolefin fabric sheet.

Vapor permeable, spun-bond, non-woven polyolefin sheets are well-known and commercially available. They are typically made of polyethylene and/or polypropylene. The process of making a spun bond, non-woven polyolefin fabric sheet vapor permeable is also well known. Mukhopadhyay (Journal of Industrial Textiles 2008:37:225) provides a comprehensive review on designing waterproof breathable fabrics. The process of making a spun-bond vapor permeable membrane which meets air barrier requirements as described in ASTM E2179 is also well known to those skilled in the art. The fabric sheets utilized in the present disclosure provide both water and air resistance barriers as defined by AC 38 (ICC-ES) and ASTM E 2179. The vapor permeance is greater than 10 perms, or greater than 15 perms, or greater than 20 perms (ASTM E96A at 75° F.). The fabric sheet is coated or partially coated on one side with a pressure sensitive adhesive. The fabric sheet is partially coated on one side with a release agent. A silicone release agent could be used. A silicone rubber can be employed as the silicone release agent. The disclosure further contemplates the use of a urethane, a fluorocarbon, and an acrylic as alternative release agents.

Any pressure sensitive adhesive currently used to adhere membranes to building substrates may be used. These include both vapor permeable and vapor impermeable pressure sensitive adhesives. If a vapor permeable pressure sensitive adhesive is used, the fabric sheet may be completely coated on one side. If a vapor impermeable pressure sensitive adhesive is used, then the fabric sheet may be only partially coated with adhesive, typically in the range of about 20-85%, more typically about 30-80%, most typically 40-70%, of the surface area of the sheet. In other words, at least 15-80%, preferably 20-70%, most preferably 30-60%, of the surface area of the fabric sheet should be adhesive-free in order to maintain sufficient vapor permeability of the membrane. Partial coatings of adhesive may be applied in a pattern. Such partial coatings are described, for example, in U.S. Pat. Nos. 3,039,893, 3,426,754, 5,374,477, 5,593,771, 5,895,301, 6,495,229, and 6,901,712.

The silicone coating can similarly be a partial coating of the fabric sheet in the ranges identified in the preceding paragraph. It is also contemplated that the silicone coating and the adhesive coatings will be applied at a complementary ratio. For example, the silicone may be applied to cover about 10%, or 20%, or 30% more area than the adhesive coating. Furthermore, if the adhesive is applied in a pattern, the silicone can be applied in a similar pattern having a larger footprint than the adhesive. For example, if the adhesive if applied in repeated diamond shapes the silicone can be applied in similar diamond shapes of the same or slightly larger size. In this manner, when the sheet is rolled upon itself, the adhesive pattern will overlay the same pattern of silicone to prevent the adhesive from contacting the barrier sheet.

The present disclosure contemplates the application of the adhesive and silicone coatings using the gravure roll methods described in U.S. Provisional Application No. 62/664,622, filed Apr. 30, 2018, and International Application No. PCT/US2019/029807, filed Apr. 30, 2019, the disclosures of which are herein incorporated by reference. Alternatively, the adhesive and/or the silicone release agent can be applied by printing or spraying. Different or the same method may be used for the adhesive and the silicone release agent.

Referring now to FIG. 1, the present disclosure provides a roll 10 comprising an air and water barrier article 21 formed of a water vapor permeable sheet material. The barrier sheet has opposing first and second major surfaces 13, 22 with a pressure sensitive adhesive 25 disposed on at least the first major surface of the article 22 and a silicone release agent layer 33 disposed on the second major surface 13. The pressure sensitive adhesive 25 contacts the silicone release agent layer 33 when wound up in the roll.

Referring now to FIGS. 2A-2D, the air and water barrier article 10 includes a barrier layer 22. The barrier can be a multi-layer sheet material. The barrier sheet can meet the requirements of Modified Test 1 of ASTM D-1970/D1970M-13, Modified Test 2 of ASTM D-1970/D-1970M-13, Modified Test 3 of ASTM D-1970/D-1970M-13, or combinations thereof. In some embodiments, the air and water barrier is water vapor permeable and a barrier to air and water.

A pressure sensitive adhesive 25 is discontinuously disposed on a first major surface 22 of the barrier sheet 22. In some embodiments, the pressure sensitive adhesive is discontinuously disposed on at least one of the aforementioned surfaces in a random manner. In some embodiments, the pressure sensitive adhesive is discontinuously disposed in a patterned manner. As best illustrated in FIG. 2B, a hexagonal shaped adhesive pattern 35 can be used. Of course, the disclosure is not limited to the shape illustrated. In some embodiments, the pressure sensitive adhesive covers 10% to 90% of the first major surface of the barrier sheet.

The silicone release agent 33 can be deposited in a similar pattern, such as hexagons 43. In some embodiments, the pattern of the adhesive and the pattern of the silicone can be the same. In this manner, the adhesive will overlap the silicone when the sheet is rolled up. To facilitate the overlap, it may be desirable to form the silicone release agent shapes to be slightly larger (e.g. 10 to 20%) than the adhesive shapes. Of course, the disclosure contemplates the use of any size and/or shape of adhesive and silicone release agent deposition that allows the adhesive to contact the rubber when the sheet is rolled. In this manner, the sheet can be rolled up without the addition of a liner and the adhesive can be prevented from damaging the barrier sheet during the unrolling process.

In some embodiments, materials useful for the barrier layer include perforated polymeric materials. In some embodiments, perforated polymeric material is selected from polyolefin, oriented polyolefin, polyester, oriented polyester, multilayer films and combinations thereof. In some embodiments, the barrier layer is a nonwoven selected from at least one of polyester, polylactic acid, polyolefin, polyamide, rayon and combinations thereof. In some embodiments, the barrier layer comprises blown microfibers. In some embodiments, the barrier layer includes at least one of the following materials: extruded netting, scrims, and the like. In some embodiments, the barrier layer is a woven material. In some embodiments, the presently disclosed polymeric material includes a polyoxyalkylene polymer having at least one end group derived from an alkoxy silane.

The polyoxyalkylene polymer may be silyl terminated. In some embodiments, the polyoxyalkylene polymer further comprises at least one silyl modified branched group.

Materials useful in the presently disclosed polymeric material include solid materials and foam materials. In some embodiments, the foam material includes closed cell foams. Other ingredients useful in the presently disclosed polymeric materials include various additives such as dehydrating agents, rheology additives, compatibilizers, tackifiers, physical property modifiers, photocurable substances, oxygen-curable substances, storage stability improving agents, fillers, epoxy resins, epoxy resin curing agents antioxidants, adhesion promoters, ultraviolet absorbers, metal deactivators, antiozonants, antioxidants, light stabilizers, lubricants, amine type radical chain inhibitors, phosphorus containing peroxide decomposers, lubricants, pigments, foaming agents, solvents, flame retardants, antifungal agents, blowing agents, and antistatic agents, each in an adequate amount. These additives may be added singly to the curable composition or two or more thereof may be added in combination to the curable composition. Specific examples of these additives are disclosed in publications such as Japanese Kokoku Publications H4-69659 and H7-108928, and Japanese Kokai Publications S63-254149, S64-22904, 2001-72854, and 2008-303650.

In the polymeric materials of the present invention, there may further be added UV stabilizers or antioxidants in an amount of from 0-5 parts per 100 parts silyl terminated polymer. These materials improve heat stability and UV resistance, although the later effect is less important when the sealer composition of the invention is painted over. Useful UV stabilizers and antioxidants include those available under the trade designations "TINUVIN 770", "TINUVIN 327", "TINUVIN 1130" and "TINUVIN 292" from Ciba-Geigy.

In some embodiments, the barrier layer is microporous membrane. Suitable microporous membranes include thermally induced phase separated porous membranes such as that described in U.S. Pat. No. 5,120,594. Such membranes are commercially available under the trade designation "ProPore" from 3M, Minneapolis, Minn. Suitable microporous membranes also include stretched calcium carbonate filled polyolefin film as described in U.S. Pat. No. 4,923,650. Such membranes are commercially available under the trade designation "Micropro" from Clopay Plastics, Mason, Ohio. Suitable microporous membranes preferably spunbonded or fibrous bonded polyolefin as described in U.S. Pat. Nos. 3,532,589 and 5,972,147. In some instances, the polyolefins are cast, annealed and then stretched. Preferred polyolefins are polyethylene and polypropylene. One suitable microporous membrane is commercially available under the trade designation "TYVEK" from E.I. DuPont deNemours Corp., Wilmington, Del. Other suitable microporous membranes include oriented polymeric films as described in U.S. Pat. No. 5,317,035, and which comprise ethylene-propylene block copolymers. Such membranes are commercially available under the trade designation "APTRA films" from BP-Amoco Corp., Atlanta, Ga. Suitable microporous membranes can be formed from immiscible polymer materials or polymer materials that have an extractable component, such as solvent. These materials are stretched after casting.

In some embodiments, the barrier layer has a moisture vapor transmission rate of greater than or equal to 1 perm, preferably greater than or equal to 5 perms, and more preferably greater than or equal to 10 perms.

Any pressure sensitive adhesive used to adhere air and water barrier articles to architectural structures (e.g., buildings) may be used. These include both vapor permeable and vapor impermeable pressure sensitive adhesives. An example of the latter is a rubber modified asphalt (bitumen) pressure sensitive adhesive or a synthetic rubber pressure sensitive adhesive. Such pressure sensitive adhesives are well known in the art.

In some embodiments, the adhesive is selected to be a solventless or hot melt adhesive. In some embodiments, solvent based adhesives or water based adhesives may be used. Exemplary types of adhesives include, for example, radiation-cured, e.g., ultraviolet (UV) radiation or electron-beam cured, (co)polymers resulting from polymerizable monomers or oligomers) may be used. The applied adhesive is preferably tacky (i.e. sticky) and pressure sensitive. UV cured acrylic adhesives are one option.

Solventless pressure sensitive adhesives may contain (meth)acrylic homopolymers and copolymers, such as for example isooctyl acrylate, 2-ethylhexyl acrylate. In addition, polar comonomers can be included, such as for example acrylic acid, itaconic acid, 2-carboxy ethyl acrylate, acrylamide and its substituted derivatives. Optional additives include tackifiers, pigments, fillers, UV stabilizers, flame retardants, thixotropic agents, viscosity modifiers, and the like.

Suitable hot melt adhesives may contain such ingredients as (co)polymers such as butyl rubber, styrene-butadiene-styrene (SBS), styrene-isoprene-styrene (SIS), styrene butadiene (SB), styrene-ethylene-butadiene-styrene (SEBS) and ethylene/vinylacetate (EVA); and (meth)acrylic homopolymers and copolymers. The following passage describes additives commonly used in hot melt adhesives. They are not typically used as adhesives by themselves. Resins such as those of the hydrocarbon and rosin types are employed as tackifiers in hot melt adhesives. Natural and petroleum waxes, oil, and bitumen are used as additives.

Solvent-based adhesives may contain ingredients such as those listed above, dissolved or dispersed in a solvent vehicle. Water based adhesives would normally be based on emulsions of (co)polymeric materials. Suitable (co)polymeric materials include vinyl acetate and (meth)acrylic homopolymers and copolymers. Water based adhesives may have the disadvantage that they generally require the additional use of drying ovens or heat lamps to evaporate the water.

The adhesive may suitably be applied at a thickness of 0.001 inches to 0.1 inch (about 2.54-254 millimeters) but is preferably applied at a thickness of 0.003 inches to 0.025 inches (about 7.62-63.5 millimeters) and most preferably at a thickness of 0.005 inches to 0.02 inches (about 0.127-0.508 millimeters).

The silicone release agent can be a type that can be applied through printing, gravure coating or spraying. The silicone release agent can be a combination of silicone rubber gum and silica. The silicone release agent can be a polydimethylsiloxane, a polydimethylsiloxane wherein a small number of methyl groups are replaced by vinyl, phenyl, or trifluoropropyl groups, and combinations thereof. The silicone release agent can further be blended with another elastomer. In this manner, the adhesion of the silicone release agent to the barrier sheet material can be modified. In certain embodiments, the bond between the silicone release agent and the barrier material will be stronger than the bond between the adhesive and the silicone release agent. The silicone release agent can be a liquid type. A UV curable silicone can be used. The pressure sensitive adhesive can have an adhesion to the silicone release agent coated barrier sheet that is between 0.5 and 10 oz/inch. The silicone release agent can be flame and water resistant. The silicone release agent can be transparent or colored.

The silicone may suitably be applied at a thickness of 0.001 inches to 0.05 inch (about 2.54-254 millimeters) but is preferably applied at a thickness of less than the thickness of the adhesive.

Example 1

This example demonstrates the process of depositing a silicone release with a patterned design onto a breathable housewrap substrate.

A spun-bond vapor permeable membrane, Delta Vent S from Dorken, was used as a substrate. A UV curable acrylic adhesive, AcResin 250 from BASF, was used as the adhesive. A UV curable silicone release, Silcolease UV Poly 124 from Elkem Silicones, was used as the liner replacement release agent.

Figure 3:
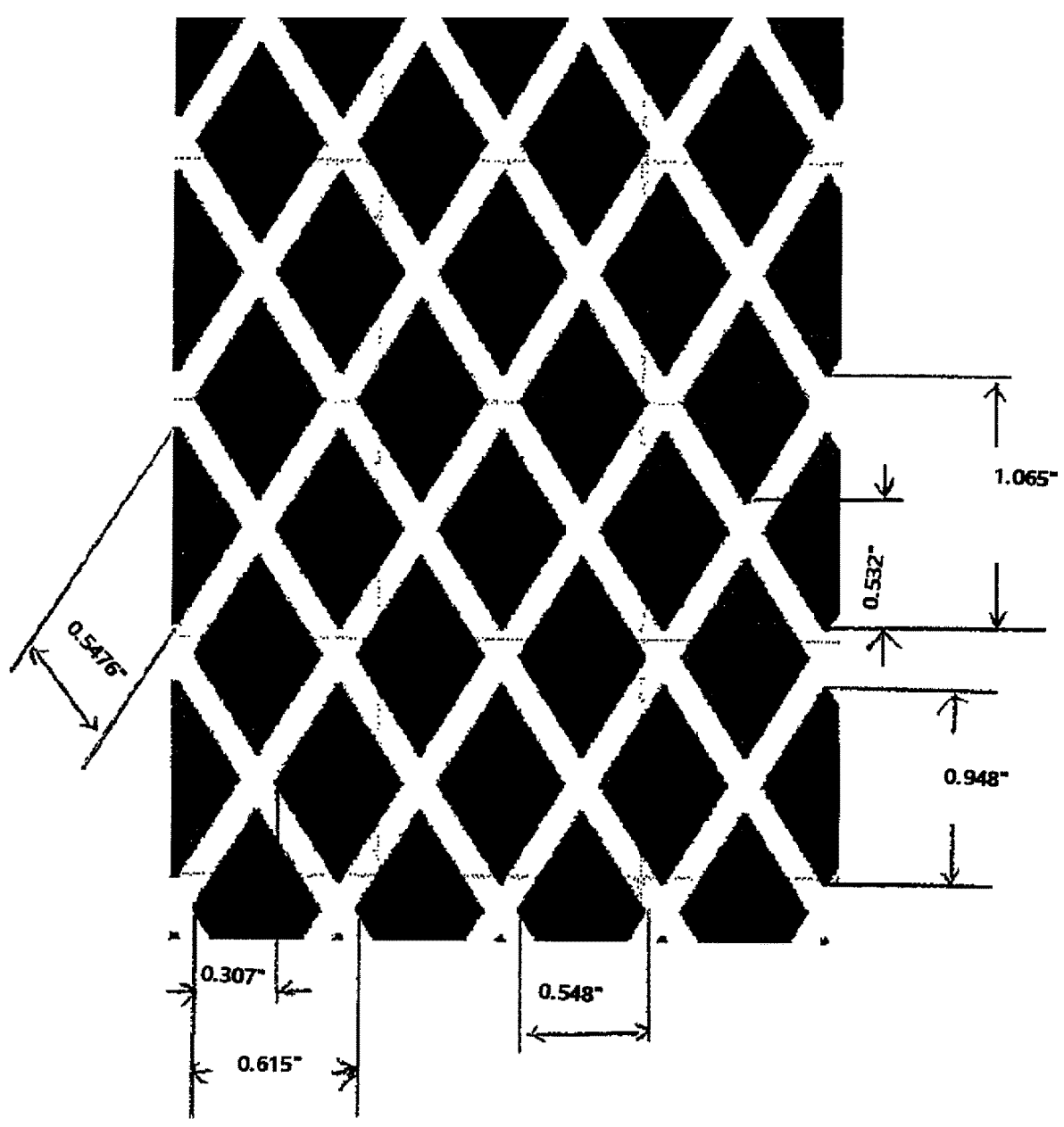
FIG. 3 is an illustration of the silicone pattern of Example 1.

The UV curable silicone release was picked up by a volume gravure roll (39.25") and then transferred to a rubber roll in the pattern shown in FIG. 3 (the shaded area is silicone release). The silicone was then deposited onto the spun-bond vapor permeable membrane, followed by UV curing to crosslink the UV silicone. The coat weight of the UV silicone was about 1.8 g/m2 based on the spun-bond vapor permeable membrane. The silicone release had a coverage of 79% based on the surface area of the spun-bond vapor permeable membrane.

Figure 4:
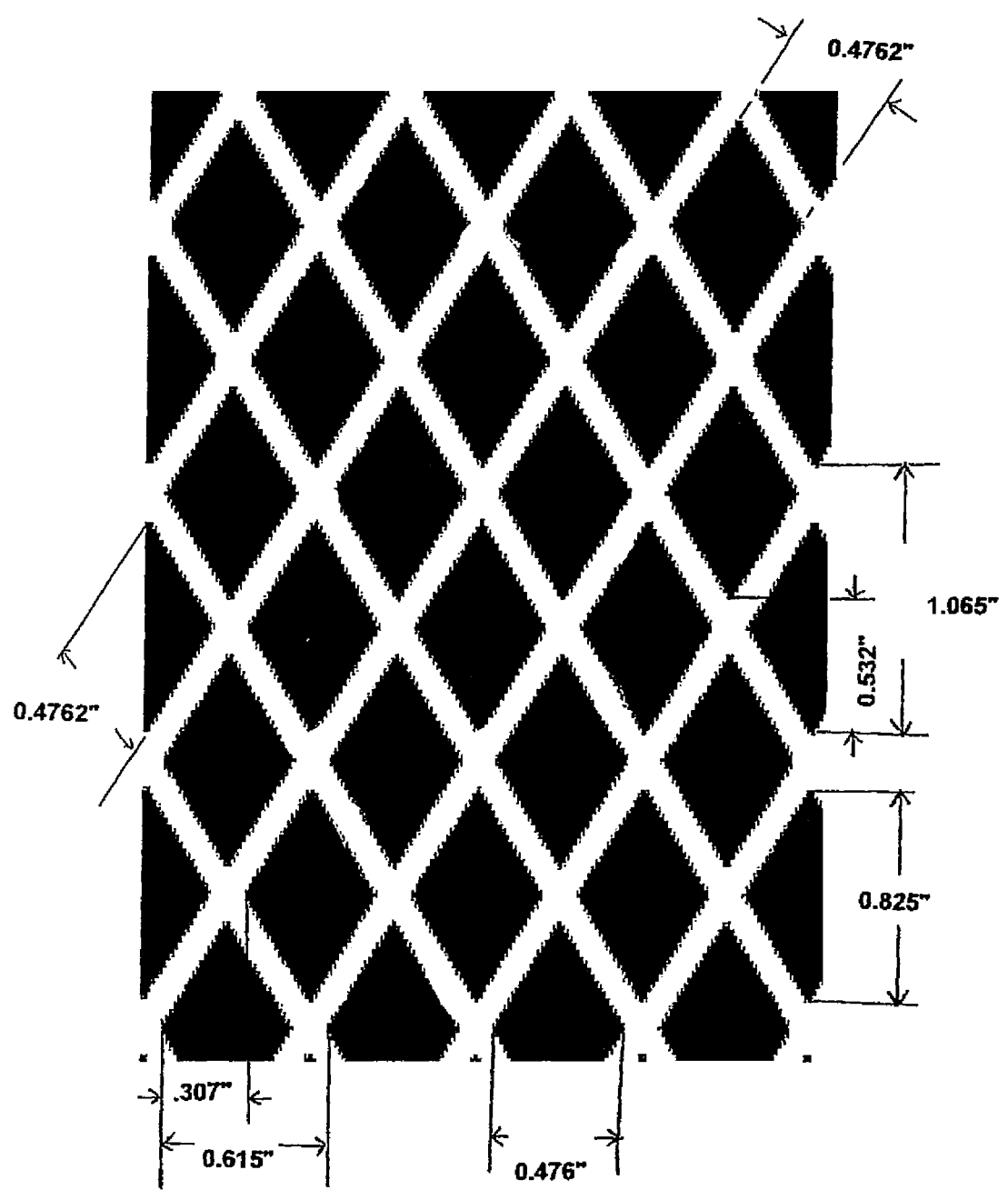
FIG. 4 is an illustration of the adhesive pattern of Example 1.

The patterned silicone coated spun-bond vapor permeable membrane was then coated with a UV curable acrylic adhesive on the other side of the membrane with the patterned design shown in FIG. 4 (the shaded area is adhesive).

The adhesive was pumped from a drum unloader (290° F.) to a semi-enclosed and heated adhesive box (330° F.) where a gravure roll with 18 mil. deep cells contacted the adhesive and filled up the gravure cells. A doctor blade at 300° F.

wiped off excessive adhesive. The adhesive in the gravure cells was transferred onto a 1 mil PET release liner. The adhesive on the release liner entered a UV chamber for curing under a UV % intensity of 70% (UV dose=79.9 mJ/cm²), followed by laminating the adhesive onto the spun-bond vapor permeable membrane using a 20 psi lamination pressure. The release liner was removed after the adhesive was transferred onto the membrane at a thickness of 8 mil. The adhesive had a coverage of 60% based on the surface area of the spun-bond vapor permeable membrane Care was taken to index the position of the patterned design of the adhesive with the patterned design of the silicone release. After the roll was self-wound, the adhesive only adhered to the silicone. The dimension of the patterned silicone release was about 15% larger than that of the patterned adhesive.

Physical property testing showed that the adhesion to backing of the resulting liner free peel-and-stick wrap was about 5-10 oz/in, which made it possible to unwind the wrap without a liner.

To aid the Patent Office and any readers of this application and any resulting patent in interpreting the claims appended hereto, applicants do not intend any of the appended claims or claim elements to invoke 35 U.S.C. 112 (f) unless the words "means for" or "step for" are explicitly used in the particular claim.

The invention claimed is:

1. A roll comprising a vapor permeable, air and water barrier article with no liner present, the article having opposing first and second major surfaces, a pressure sensitive adhesive disposed on the first major surface of the article, and a release agent disposed on the opposing second major surface of the article, the release agent covering less than 100% of the second major surface, each of the pressure sensitive adhesive and the release agent are in the form of repeating pattern shapes, the pattern shapes being separated from adjacent pattern shapes, wherein the release agent pattern shape is larger than the pressure sensitive adhesive pattern shape and wherein the pressure sensitive adhesive contacts only the release agent when wound in the roll.

2. The roll of claim 1, wherein the barrier article has a vapor permeance greater than 20 perms as measured by ASTM E 96A at 75° F.

3. The roll of claim 2 wherein the pressure sensitive adhesive has a thickness between 0.001 inch and 0.1 inch and the release agent has a thickness less than the pressure sensitive adhesive.

4. A roll comprising a vapor permeable, air and water barrier article with no liner present, the article having opposing first and second major surfaces, a pressure sensitive adhesive is disposed on the first major surface of the article, the pressure sensitive adhesive covering less than 100% of the first major surface, and a silicone release agent is disposed on the opposing second major surface of the article, the silicone release agent covers less than 100% of the second major surface, each of the pressure sensitive adhesive and the silicone release agent are in the form of repeating pattern shapes, the pattern shapes being separated from adjacent pattern shapes, wherein the silicone release agent pattern shape is larger than the pressure sensitive adhesive pattern shape and wherein the pressure sensitive adhesive contacts the silicone release agent when wound in the roll.

5. The roll of claim 4 wherein the pressure sensitive adhesive covers between about 30 and 80% of the first major surface.

6. The roll of claim 5 wherein the silicone release agent covers between 40 and 90% of the second major surface.

7. The roll of claim 6 wherein the silicone release agent covers a larger area of the second major surface than an area of the first major surface covered by the pressure sensitive adhesive.

8. The roll of claim 4 wherein the silicone release agent and the pressure sensitive adhesive each form a layer on the article and wherein the pressure sensitive adhesive has a depth which is greater than the silicone release agent.

9. The roll of claim 4 wherein the patterns are complimentary.

10. The roll of claim 9 wherein the patterns are at least substantially the same shape.

11. The roll of claim 9 wherein the pattern is diamonds, hexagons or circles.

12. The roll of claim 10 wherein the patterns formed by the silicone release agent are larger than the patterns formed by the pressure sensitive adhesive.

13. The roll of claim 12 wherein the roll does not include a liner and wherein the pressure sensitive adhesive comprises a vapor impermeable adhesive of a UV curable acrylic.

14. The roll of claim 4 wherein the silicone release agent is transparent.

15. The roll of claim 4 wherein the silicone release agent is colored.

16. The roll of claim 4 wherein the silicone release agent and the pressure sensitive adhesive are each UV curable.

17. The roll of claim 4 wherein the article is comprised of at least two laminated non-woven layers.

18. The roll of claim 4 wherein the pressure sensitive adhesive has an adhesion to the silicone release agent coated barrier article of between 0.5 and 10 oz/inch.

19. The roll of claim 4 wherein the pressure sensitive adhesive only contacts silicone release agent.

20. A method of forming a roll of a vapor permeable, air and water barrier article with no liner present, the article having opposing first and second major surfaces, the method comprising applying a pressure sensitive adhesive in a pattern on the first major surface of the article and applying a silicone release agent in a pattern on the opposing second major surface of the article, the silicone release agent covering less than 100% of the second major surface to provide a coverage area of silicone release agent and the pressure sensitive adhesive covering less than the coverage area of the silicone release agent on the second major surface, each of the pressure sensitive adhesive and the silicone release agent are in the form of repeating complimentary pattern shapes, the pattern shapes being separated from adjacent pattern shapes, wherein the silicone release agent pattern shape is larger than the pressure sensitive adhesive pattern shape and wherein the pressure sensitive adhesive contacts the silicone release agent when wound in the roll.

* * * * *